United States Patent
Evans et al.

(10) Patent No.: US 7,587,171 B2
(45) Date of Patent: Sep. 8, 2009

(54) REDUCING INTERFERENCE IN A WIRELESS COMMUNICATIONS SIGNAL IN THE FREQUENCY DOMAIN

(75) Inventors: Richard O. Evans, Laytonsville, MD (US); Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 545 days.

(21) Appl. No.: 11/367,955

(22) Filed: Mar. 3, 2006

(65) Prior Publication Data

US 2006/0205346 A1     Sep. 14, 2006

Related U.S. Application Data

(60) Provisional application No. 60/659,794, filed on Mar. 9, 2005.

(51) Int. Cl.
    *H04B 1/00*    (2006.01)
(52) U.S. Cl. ............... 455/63.1; 455/114.2; 455/278.1; 455/296
(58) Field of Classification Search .......... 455/427, 455/114.2, 278.1, 296, 63.1
    See application file for complete search history.

(56) References Cited

U.S. PATENT DOCUMENTS

| | | | |
|---|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,410,750 A | 4/1995 | Cantwell et al. |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |

(Continued)

FOREIGN PATENT DOCUMENTS

EP     0 506 255 A2     9/1992

(Continued)

OTHER PUBLICATIONS

International Search Report for PCT/US2006/008180; Date of Mailing Jun. 23, 2006.

(Continued)

*Primary Examiner*—Lester Kincaid
*Assistant Examiner*—Wayne Cai
(74) *Attorney, Agent, or Firm*—Myers Bigel Sibley & Sajovec, P.A.

(57) ABSTRACT

Methods of reducing interference in wireless communications in a communications system are provided. A wireless communications signal is received within a frequency band. The wireless communications signal includes a desired component and an undesired interference component. The interference component may be caused by, for example, communications by another component of the communications system using frequencies in the frequency band. The received communications signal is converted to a frequency domain representation. Frequencies of the interference component of the frequency domain signal are identified. At least some of the identified frequencies of the interference component of the frequency domain signal are attenuated to generate an interference attenuated frequency domain signal. The interference attenuated frequency domain signal is converted to an interference attenuated time domain signal.

34 Claims, 3 Drawing Sheets

U.S. PATENT DOCUMENTS

| | | |
|---|---|---|
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,684,057 B2 | 1/2004 | Karabinis |
| 6,775,251 B1 | 8/2004 | Wiedeman et al. |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054761 A1 | 3/2003 | Karabinis |
| 2003/0054762 A1 | 3/2003 | Karabinis |
| 2003/0054814 A1 | 3/2003 | Karabinis et al. |
| 2003/0054815 A1 | 3/2003 | Karabinis |
| 2004/0102156 A1 | 5/2004 | Loner |
| 2004/0174943 A1* | 9/2004 | Agarwal et al. ............. 375/346 |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 969 A1 | 4/2002 |
| GB | 2 304 000 A | 3/1997 |
| WO | WO 01/54314 A1 | 7/2001 |

OTHER PUBLICATIONS

U.S. Appl. No. 10/730,660, filed Dec. 5, 2003, Karabinis.

* cited by examiner

REDUCING INTERFERENCE IN A WIRELESS COMMUNICATIONS SIGNAL IN THE FREQUENCY DOMAIN

CROSS-REFERENCE TO RELATED APPLICATION

This application claims the benefit of provisional U.S. Patent Application No. 60/659,794, filed Mar. 9, 2005 with the U.S. Patent Office, entitled Interference Reduction in Satellite Communications by Excision, the disclosure of which is hereby incorporated herein by reference in its entirety as if set forth fully herein.

FIELD OF THE INVENTION

This invention relates to wireless communications systems and methods, and more particularly to satellite communications systems and methods.

BACKGROUND

Satellite radioterminal communications systems and methods are widely used for radioterminal communications. Satellite radioterminal communications systems and methods generally employ at least one space-based component, such as one or more satellites that is/are configured to wirelessly communicate with a plurality of satellite radioterminals.

A satellite radioterminal communications system or method may utilize a single antenna pattern (i.e., a global beam) to cover an entire area served by the system. Alternatively, or in combination with the above, in cellular satellite radioterminal communications systems and methods, multiple antenna patterns (i.e., beams or cells) are provided, each of which can serve substantially a distinct geographical area in an overall service region, to collectively serve an overall satellite footprint. Thus, a cellular architecture similar to that used in conventional terrestrial cellular radioterminal systems and methods can be implemented in cellular satellite-based systems and methods. The satellite typically communicates with radioterminals over a bidirectional communications pathway, with radioterminal communications signals being communicated from the satellite to the radioterminal over a service downlink (forward-link), and from the radioterminal to the satellite over a service uplink (return-link).

The overall design and operation of cellular satellite radioterminal systems and methods are well known to those having skill in the art, and need not be described further herein. Moreover, as used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and/or a pager, Internet and/or Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A radioterminal also may be referred to herein as a "radiotelephone," a "mobile terminal," a "mobile user device," a "user device" or simply as a "terminal." Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

As is well known to those having skill in the art, terrestrial networks can enhance cellular satellite radioterminal system availability, efficiency and/or economic viability by terrestrially using/reusing at least some frequencies of at least one frequency band that is allocated to and/or authorized for use by one or more cellular satellite radioterminal systems. In particular, it is known that it may be difficult for cellular satellite radioterminal systems to reliably serve densely populated areas, because satellite signals may be blocked by high-rise structures and/or may not penetrate into buildings. As a result, satellite frequencies may be underutilized or unutilized in such areas. The use of terrestrial transmission and/or retransmission of all or some frequencies of a satellite band of frequencies can reduce or eliminate this problem.

Moreover, a capacity of an overall system, comprising space-based and terrestrial communications capability, can be increased significantly by the introduction of terrestrial transmission/retransmission, since terrestrial frequency use/reuse can be much denser than that of a satellite-only system. In fact, capacity can be enhanced where it may be mostly needed, i.e., in and/or proximate to densely populated urban, industrial, and/or commercial areas. As a result, the overall system can become much more economically viable, as it may be able to serve a much larger subscriber base. Finally, satellite radioterminals for a hybrid satellite/terrestrial radioterminal system having a space-based and a terrestrial component that provide communications within a common satellite frequency band and using substantially the same air interface for both terrestrial and satellite communications can be more cost effective and/or aesthetically appealing. Exemplary conventional dual band and dual mode satellite and terrestrial radiotelephone systems include Thuraya, Iridium and Globalstar.

U.S. Pat. No. 6,684,057 issued Jan. 27, 2004, to the present inventor Karabinis, and entitled Systems and Methods for Terrestrial Reuse of Cellular Satellite Frequency Spectrum, the disclosure of which is hereby incorporated herein by reference in its entirety as if set forth fully herein, describes that a satellite radioterminal frequency can be reused terrestrially by an ancillary terrestrial network even within the same satellite cell, using interference cancellation techniques. In particular, the satellite radioterminal system according to some embodiments of U.S. Pat. No. 6,684,057 includes a space-based component that is configured to receive wireless communications from a first radioterminal in a satellite footprint over a satellite radioterminal frequency band, and an ancillary terrestrial network that is configured to receive wireless communications from a second radioterminal in the satellite footprint over the satellite radioterminal frequency band. The space-based component also receives the wireless communications from the second radioterminal in the satellite footprint over the satellite radioterminal frequency band as interference, along with the wireless communications that are received from the first radioterminal in the satellite footprint over the satellite radioterminal frequency band. An interference reducer is configured to reduce the interference from the wireless communications that are received by the space-based component from the first radioterminal in the satellite footprint over the satellite radioterminal frequency band, using the wireless communications that are received by the ancillary terrestrial network from the second radioterminal in the satellite footprint over the satellite radioterminal frequency band.

United States Patent Application Publication No. 2003/0054761 A1, published Mar. 20, 2003 to the present inventor Karabinis and entitled Spatial Guardbands for Terrestrial Reuse of Satellite Frequencies, the disclosure of which is hereby incorporated herein by reference in its entirety as if set forth fully herein, describes satellite radioterminal systems that include a space-based component that is configured to provide wireless radioterminal communications in a satellite footprint over a satellite radioterminal frequency band. The satellite footprint is divided into a plurality of satellite cells, in which satellite radioterminal frequencies of the satellite radioterminal frequency band are spatially reused. An ancillary terrestrial network is configured to terrestrially reuse at least one of the radioterminal frequencies that is used in a satellite cell in the satellite footprint, outside the cell and in some embodiments separated therefrom by a spatial guardband. The spatial guardband may be sufficiently large to reduce or prevent interference between the at least one of the satellite radioterminal frequencies that is used in the satellite cell in the satellite footprint, and the at least one of the satellite radioterminal frequencies that is terrestrially reused outside the satellite cell and separated therefrom by the spatial guardband. The spatial guardband may be about half a radius of a satellite cell in width.

United States Patent Application Publication No. US 2003/0054815 A1, published Mar. 20, 2003 to the present inventor Karabinis, and entitled Methods and Systems for Modifying Satellite Antenna Cell Patterns in Response to Terrestrial Reuse of Satellite Frequencies, the disclosure of which is hereby incorporated herein by reference in its entirety as if set forth fully herein, describes that space-based wireless radioterminal communications are provided in a satellite footprint over a satellite radioterminal frequency band. The satellite footprint is divided into satellite cells in which satellite radioterminal frequencies of the satellite radioterminal frequency band are spatially reused. At least one of the satellite radioterminal frequencies that is assigned to a given satellite cell in the satellite footprint is terrestrially reused outside the given satellite cell. A radiation pattern of at least the given satellite cell is modified to reduce interference with the at least one of the satellite radioterminal frequencies that is terrestrially reused outside the given satellite cell.

Although various cellular satellite radioterminal systems and methods have been proposed for reducing interference among the components of those systems, continued improvements in reducing interference are desirable.

SUMMARY

According to some embodiments of the present invention, methods of reducing interference in wireless communications in a communications system are provided. A wireless communications signal is received within a frequency band. The wireless communications signal includes a desired component and an undesired interference component. The interference component may be caused by, for example, communications by another component of the communications system using frequencies in the frequency band. The received communications signal is converted to the frequency domain. Frequencies of the interference component of the frequency domain signal are identified. At least some of the identified frequencies of the interference component of the frequency domain signal are attenuated to generate an interference attenuated frequency domain signal. The interference attenuated frequency domain signal is converted to an interference attenuated time domain signal. Accordingly, the interference component of the communications signal can be identified and attenuated in the frequency domain to produce a time domain signal having reduced interference.

Related communications systems, radioterminals, satellites, ancillary terrestrial components, and interference reduction components are also provided.

DETAILED DESCRIPTION

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The symbol "/" is also used as a shorthand notation for "and/or".

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second may be used herein to describe various elements, these elements should not be limited by these terms. These terms are only used to distinguish one element from another element. Thus, a first radiotelephone below could be termed a second radiotelephone, and similarly, a second radiotelephone may be termed a first radiotelephone without departing from the teachings of the present invention.

Moreover, as used herein, "substantially the same" band(s) means that two or more bands being compared substantially overlap in frequency, but that there may be some areas of non-overlap, for example at a band end(s) and/or elsewhere. "Substantially the same" air interface(s) means that two or more air interfaces being compared are similar but need not be identical. Some differences may exist in one air interface (i.e., a satellite air interface) relative to another (i.e., a terrestrial air interface) to account for and/or accommodate different characteristics that may exist between, for example, a terrestrial and satellite communications environments. For example, a different vocoder rate may be used for satellite communications compared to the vocoder rate that may be used for terrestrial communications (i.e., for terrestrial communications, voice may be compressed ("vocoded") to approximately 9 to 13 kbps, whereas for satellite communications a vocoder rate of 2 to 4 kbps, for example, may be used); a different forward error correction coding, different interleaving depth, and/or different spread-spectrum codes may also be used, for example, for satellite communications compared to the coding, interleaving depth, and/or spread spectrum codes (i.e., Walsh codes, long codes, and/or frequency hopping codes) that may be used for terrestrial communications. As used herein, the term "narrow-band" relates to a comparison between two signals. A first signal may be called "narrow-band" relative to a second signal if a bandwidth associated with the first signal is significantly less compared to a bandwidth associated with the second signal (e.g., the bandwidth of the first signal is approximately one order of magnitude less than the bandwidth of the second signal). For example, a signal having a bandwidth of 200 kHz may be called narrow-band compared to a signal having a bandwidth of 1.25 MHz.

Some embodiments of the present invention may arise from a recognition that, in some situations, interference to a forward and/or return link (e.g., satellite service link and/or feeder link), may be relatively strong, narrow-band and/or "bursty" in nature (i.e., the interference may be relatively high power, narrow-band and/or of relatively short time duration). In such situations, it may be difficult for an interference reducer (interference canceller) to update its coefficients rapidly enough to achieve convergence and substantially reduce/cancel a bursty, narrow-band and/or high-power interference. Embodiments of the present invention can reduce or eliminate bursty and/or substantially narrow-band interference (and/or other types of interference) that has at least one frequency in common with a desired signal, by converting an aggregate received waveform, comprising an interference component and a desired signal component, from a time-domain representation (that may be a discrete time-domain representation such as a time-domain representation provided by an Analog-to-Digital (A/D) converter and/or a Sample-and-Hold (S/H) circuit) to a frequency-domain representation, and then excising (or substantially attenuating) a portion of the frequency-domain representation of the aggregate received waveform that includes at least a portion of the interference component. The aggregate received (forward or return link) waveform with the excised (or substantially attenuated) frequency domain elements may then be converted back to a time domain representation and may be processed further, or it may be processed further while still in the frequency domain. By excising the frequency or frequencies of an interference component contained in the aggregate received waveform, interference reduction may be provided. Moreover, since the interference component may be narrow-band and bursty, a component of a desired return link and/or forward link signal that also may be excised/attenuated, in excising/attenuating the interference component, may be relatively small in relation to a non-excised portion of the desired signal, so that reduced or minimal performance loss of the desired signal may be obtained. It will also be understood by those having skill in the art that excision/attenuation according to embodiments of the present invention may also be used with interfering signals that are not narrowband and/or are not bursty. Moreover, in other embodiments, attenuation of the portion, rather than excision of the portion, may be provided.

Terrestrial use/reuse of satellite band frequencies, by radioterminals and/or terrestrial components (also referred to as base stations, ancillary terrestrial components or ATCs, and/or ancillary terrestrial networks or ATNs), may subject a satellite communications system to uplink and/or downlink interference. Also, use/reuse of satellite band frequencies by one or more radioterminals of a first satellite system, such as, for example, a first satellite system including one or more satellites with one or more relatively small antenna apertures and using radioterminals with relatively high output power levels, may subject a second satellite system, that includes one or more satellites with one or more relatively large antenna apertures, to uplink interference that may be narrow-band uplink interference. For example, the first satellite system may be an Inmarsat satellite system including one or more satellites each comprising an antenna aperture of 9 meters (or less) in diameter and the second satellite system may be a Mobile Satellite Ventures, LP ("MSV") next generation satellite system (currently under contract with Boeing) that may include satellites each having an antenna aperture of 22 meters in diameter. Furthermore, the MSV satellite system (and/or any other satellite system) may comprise at least one satellite that receives over at least two different polarizations, that may be substantially orthogonal therebetween, such as, for example, a substantially Left Hand Circular Polarization (LHCP) and a substantially Right Hand Circular Polarization (RHCP), and/or over different antenna elements that may be spatially separated therebetween, potentially further increasing an interference level to the at least one satellite. In addition, an Ancillary Terrestrial Network (ATN), comprising at least one Ancillary Terrestrial Component (ATC), that may be deployed by MSV (and/or by any other operator), may be configured to receive signals over at least two different polarizations (that may be substantially orthogonal therebetween) and/or over different antenna elements (that may be spatially separated therebetween), potentially further increasing an interference level.

Interference with communications from a satellite to a radioterminal through a service downlink, referred to as downlink interference (also referred to as forward-link interference), can be caused by communications by the same or different satellites through downlinks to other radioterminals using frequencies that are substantially the same as or adjacent to the frequencies used to communicate with the interfered radioterminal. Downlink interference can also be caused by communications between radioterminals and ancillary terrestrial components (e.g., base stations) using frequencies that are substantially the same as or adjacent to the frequencies used by the satellite service downlink frequencies. Interference with communications to a satellite and/or satellite gateway, referred to as uplink interference (also referred to as return-link interference), can be caused by radioterminal and/or ATC emissions using frequencies that are substantially the same as or adjacent to the frequencies used to communicate with the interfered satellite and/or satellite gateway.

An exemplary ancillary terrestrial component that uses satellite frequencies to communicate with radioterminals is discussed in U.S. Pat. No. 6,684,057, the disclosure of which has been incorporated above by reference.

Figure 1:
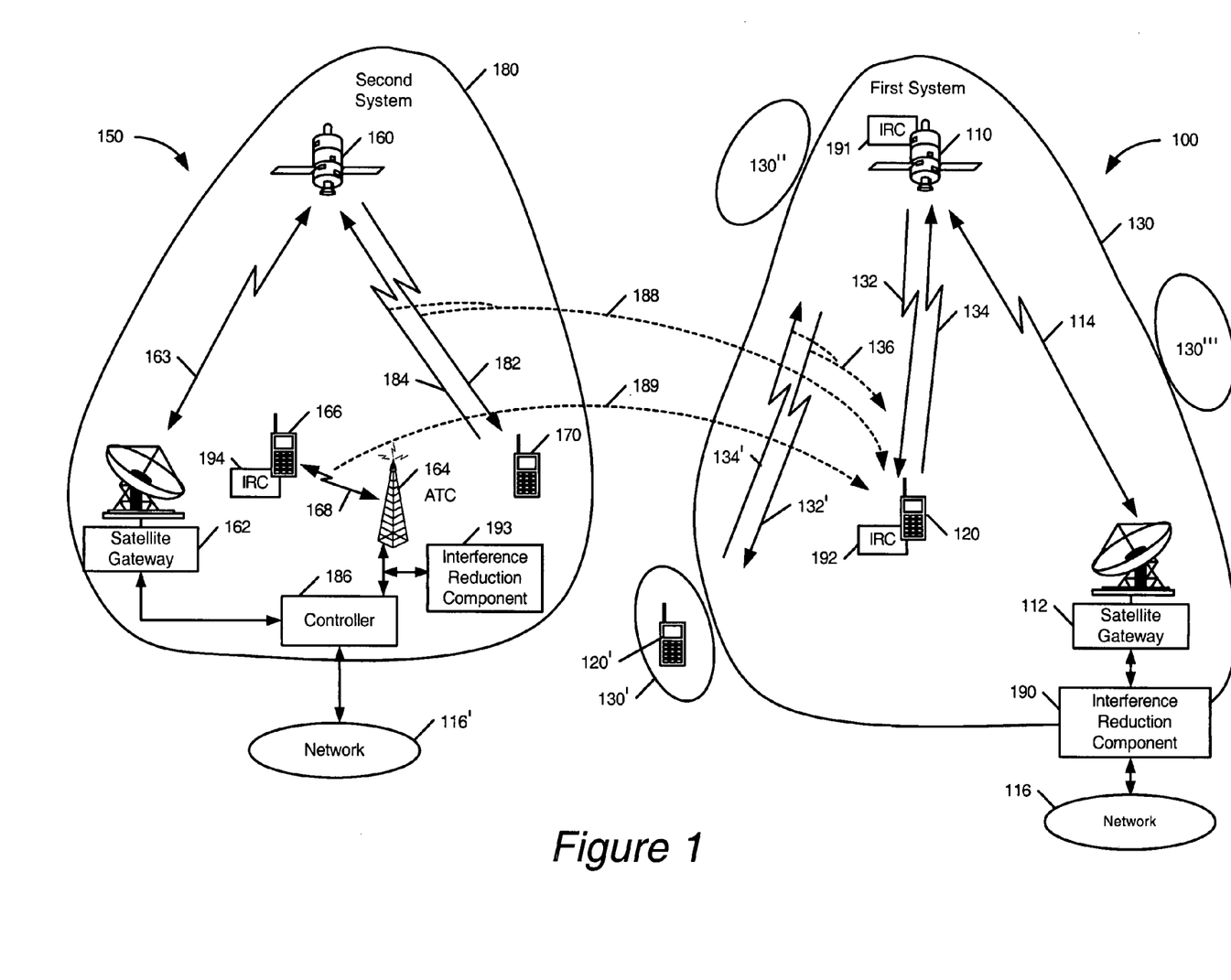
FIG. 1 is a block diagram illustrating communications systems and methods according to some embodiments of the present invention.

FIG. 1 is a schematic diagram of satellite radioterminal communications systems and methods according to some embodiments of the present invention. Referring to FIG. 1, a first satellite communications system 100 includes a space-based component comprising at least one satellite 110 and a satellite gateway 112. The satellite 110 is configured to transmit wireless communications to a plurality of radioterminals 120-120' in a satellite footprint comprising one or more satellite radioterminal cells 130-130'" over one or more service downlinks 132-132'. The satellite 110 may also be configured to receive wireless communications from the plurality of radioterminals 120-120' over one or more service uplinks 134-134'. The satellite gateway 112 may be configured to transmit communications from a network 116, such as a wireline and/or radiotelephone network, through a feeder link 114 to the satellite 110 for subsequent relay to the radioterminals 120-120' via the service downlinks 132-132', and to receive communications from the radioterminals 120-120' via the service uplinks 134-134', satellite 110, and the feeder link 114 for communications through the network 116.

When the frequencies used by a plurality of service downlinks, such as, for example, service downlinks 132-132', are sufficiently close therebetween or substantially the same, a radioterminal, such as, for example, radioterminal 120, can undesirably receive a component of communications from, for example, downlink 132' to radioterminal 120', as interference to the desired communications that it receives from downlink 132. The satellite 110 can similarly receive an undesired component of communications on uplink 134 from, for example, uplink 134', as interference to the desired communications that it receives on uplink 134. More specifically, potential downlink interference paths to down link 132 are illustrated at 136 (potential uplink interference paths, although recognized as existing, as described above, are not illustrated in FIG. 1). This interference would generally be strongest when the frequencies used by the respective service downlinks 132-132' and/or uplinks 134-134' are substantially the same. Accordingly, communications by components of the first satellite communications system 100 (terrestrially-based and/or space-based) can introduce interference into one or more communications links (providing data, video, voice, etc . . . ) such as, for example, the communications links between the radioterminal 120 and satellite 110 illustrated in FIG. 1.

A second satellite communications system 150 may contain other potential sources of interference to downlink/uplink communications between satellite 110 and radioterminal 120. The second satellite communications system 150 includes a space-based component comprising at least one satellite 160 and a satellite gateway 162, and may also include an ancillary terrestrial component 164 (the first system 100 may also include an ATC even though it is not illustrated in the Figure). The satellite 160 is configured to communicate with at least one radioterminal 170 in a satellite footprint comprising one or more satellite radioterminal cells 180 over one or more service downlinks 182 and/or one or more service uplinks 184. The geographic areas of the cell 180 of satellite 160 may at least partially overlap with the geographic areas of the cells 130-130'" of satellite 110, or they may be adjacent and/or separate therefrom as illustrated in FIG. 1. The gateway 162 may be configured to communicate with the satellite 160 through a feeder link 163, and to interface the satellite 160 and radioterminal 170 to a network 116', which may be a wireline and/or a wireless network and/or the same as network 116.

The ancillary terrestrial component 164, which may be a base station, is configured to communicate with one or more radioterminals 166 through a terrestrial communications link 168 using communications frequencies that may be substantially the same as or adjacent to those frequencies used by satellite 160 to communicate with the radioterminal 170 through the downlink 182 and uplink 184. Ancillary terrestrial systems are discussed in U.S. Continuation-in-Part patent application Ser. No. 10/730,660, to the present inventor Karabinis and entitled Systems and Methods for Terrestrial Reuse of Cellular Satellite Frequency Spectrum in a Time-Division Duplex Mode, filed Dec. 8, 2003 and assigned to the assignee of the present invention, and which is hereby incorporated herein by reference in its entirety as if set forth fully herein. The system 150 may further include a controller 186 that is configured to route communications among the ancillary terrestrial component 164, the satellite gateway 162, and the network 116'.

When the frequencies of the service downlink 182 and/or the terrestrial communication link 168 are substantially the same as, or sufficiently close to, the frequencies of downlink 132, radioterminal 120 can undesirably receive communications by satellite 160 on downlink 182 to radioterminal 170 and/or communications between radioterminal 166 and ancillary terrestrial component 164 as interference to communications that it receives on downlink 132. Similarly, satellite 110 can undesirably receive communications by radioterminal 170 on uplink 184 and/or communications between radioterminal 166 and ancillary terrestrial component 164 as interference to communications that it receives on uplink 134. More specifically, potential interference paths are shown at 188 and 189 (potential uplink interference paths, although recognized as existing, as described above, are not illustrated in FIG. 1). Accordingly, terrestrial and/or satellite communications by components of the second satellite communications system 150 can introduce interference into communications (data, video, voice, etc . . . ) between, for example, the radioterminal 120 and satellite 110 of the first satellite communication system 100.

In accordance with some embodiments of the present invention, one or more of the radioterminals 120, 120', 166, 170 and/or one or more of the components of the satellite communication systems 100 and/or 150 are configured to reduce interference in received wireless communications.

In some exemplary embodiments, the first satellite communications system 100 further includes an interference reduction component 190. The interference reduction component 190 receives a communications signal from the satellite gateway 112, which the satellite gateway 112 received from satellite 110. The communications signal includes a desired component and an undesired interference component. The desired component may include voice, data, and/or video from radioterminal 120. The interference component may be introduced into the desired communications signal from, for example, interference paths 136, 188, 189 and/or other interference paths not illustrated in FIG. 1. In accordance with some embodiments of the present invention, the interference reduction component 190 may be configured to convert a received signal from a time-domain representation (that may be a continuous time-domain and/or discrete time-domain representation) to a frequency-domain representation, and to identify a frequency content of an interference component of the frequency-domain signal. The interference reduction component 190 may also be configured to attenuate at least some of the frequency content of the interference component to generate an interference attenuated frequency domain signal, which it then converts to an interference attenuated time domain signal. Accordingly, the interference component of the received signal can be identified and attenuated in the frequency domain to produce a time domain signal having reduced interference. The reduced interference time domain signal can then be further processed to decode and/or error correct the desired component.

Although the interference reduction component 190 has been illustrated as separate from the satellite gateway 112, it may instead be at least partially within the satellite gateway 112. Moreover, the satellite 110 and/or the radioterminal 120 can include, at least partially, an interference reduction component, such as interference reduction components 191 and 192 (referred to as "IRC" for ease of illustration), respectively, and which may be used in addition to and/or in place of the interference reduction component 190. Accordingly, the radioterminal 120, satellite 110, and/or satellite gateway 112 may process, at least partially, a received signal in the frequency domain to reduce an interference component therein.

Interference reduction components may be located/distributed among other components of the systems 100 and 150. For example, the ancillary terrestrial component 164 can be connected to an interference reduction component 193 to reduce interference in signals received from radioterminal 166 through the terrestrial communication link 168. The radioterminal 166 may include an interference reduction component 194 to reduce interference in signals from ancillary terrestrial component 164.

Figure 2:
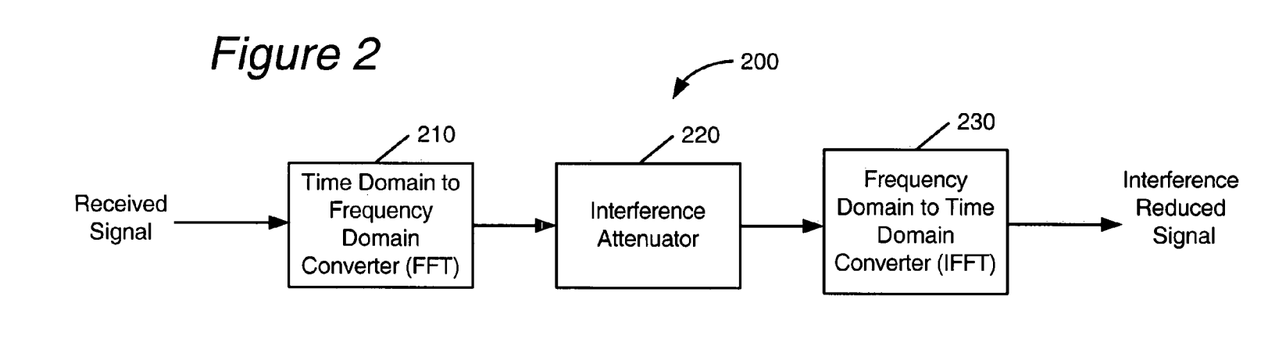
FIG. 2 is a block diagram illustrating an interference reduction component and methods of reducing interference in wireless communications according to some embodiments of the present invention.

FIG. 2 is a block diagram illustrating an interference reduction component 200 and methods of reducing interference in wireless communications according to some embodiments of the present invention. The interference reduction component 200 may be used in one or more of the interference reduction components 190-194 shown in FIG. 1. The interference reduction component 200 includes a time domain to frequency domain converter 210, an interference attenuator 220, and a frequency domain to time domain converter 230. The time domain to frequency domain converter 210 converts a received signal from a time domain representation to a frequency domain representation, and may carry out the conversion using, for example, a Fourier based transform (that may be a continuous-time and/or a discrete-time Fourier transform) such as, for example, a Fast Fourier Transform (FFT) and/or a Discrete Fourier Transform (DFT). As explained above, the received signal includes a desired component and an undesired interference component which may be caused by individual and/or aggregated effects of interference from one or more sources.

Figure 3:
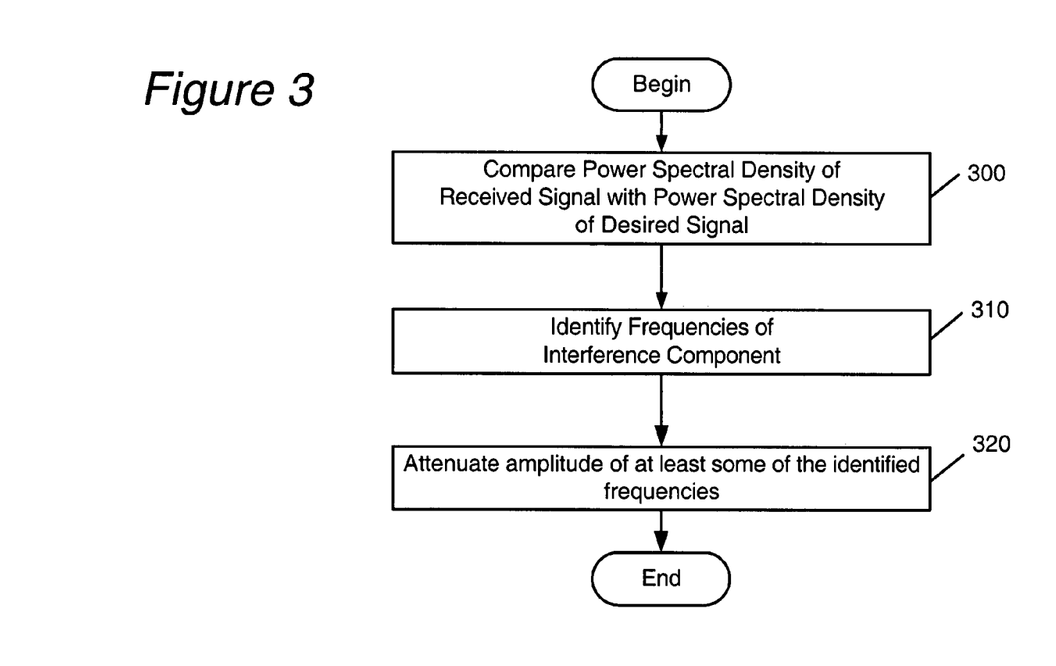
FIG. 3 is a flowchart diagram of an interference attenuator and methods of attenuating interference in the frequency domain according to some embodiments of the present invention.

The interference attenuator 220 identifies frequencies of the interference component of the frequency domain signal, and attenuates at least some of the identified frequencies of the interference component to generate an interference attenuated frequency domain signal. FIG. 3 is a flowchart diagram of the interference attenuator 220 and associated methods of attenuating interference in the frequency domain according to some embodiments of the present invention.

Referring to FIG. 3, a comparison is made (Block 300) between a power spectral density (e.g., FFT bins) of a received signal that may contain interference and a power spectral density (e.g., FFT bins) associated with a desired signal. The power spectral density associated with the desired signal may correspond to an ideal power spectral density profile of a received signal absent interference. In some embodiments of the invention, the ideal power spectral density profile may be a priori known by the interference attenuator 220. In other embodiments of the invention, the ideal power spectral density profile may be estimated by the interference attenuator 220 from one or more received waveforms. Further embodiments may use a priori knowledge and estimation by the interference attenuator 220 to determine the ideal power spectral density profile.

Frequency content of the received signal that contains interference is identified at Block 310 based on the comparison performed at Block 300. For example, if a waveform is transmitted using a CDMA based protocol (e.g., wideband-CDMA, cdma2000) the ideal power spectral density profile may be a substantially flat power spectral density profile over a pre-determined frequency interval. Accordingly, frequency content (e.g., FFT bins) of the received signal that deviate beyond a threshold amount from a flat power spectral density profile over the pre-determined frequency interval may be identified as being associated with the interference component of the received signal. The identification accuracy of the frequency content of the interference component may be improved by identifying frequencies at which the amplitude of the received frequency domain signal deviates from the amplitude of the ideal power spectral density profile by at least a threshold amount as being associated with the interference component. For example, large excursions (i.e., spikes) in the FFT representation of the received signal may be more accurately identified as being associated with frequency content of the interference component. It will be understood that in some embodiments of the invention Block 300 and Block 310 of FIG. 3 may be combined into one Block that performs the comparison and the identification functions.

At least some of the identified frequencies of the interference component may be attenuated or completely deleted/excised (Block 320) to generate an interference attenuated frequency domain signal. The attenuation may be carried out by attenuating amplitude of selected ones of the frequencies to an amplitude level of a sub-band of the received frequency domain signal that does not include the identified frequencies. Thus, for example, the amplitude of the received frequency domain signal within identified interference sub-bands may be reduced to an amplitude level that is associated with one or more other sub-bands that appear to be substantially free of interference. Alternatively, the amplitude of the received frequency domain signal within the interference sub-bands may be reduced to substantially zero (i.e., all or at least one of the interference sub-bands may be excised).

Referring again to FIG. 2, the frequency domain to time domain converter 230 converts the interference attenuated frequency domain signal to a time domain representation, and may carry out the conversion using, for example, an inverse Fourier-based transform such as an Inverse Fast Fourier Transform (IFFT).

Figure 4:
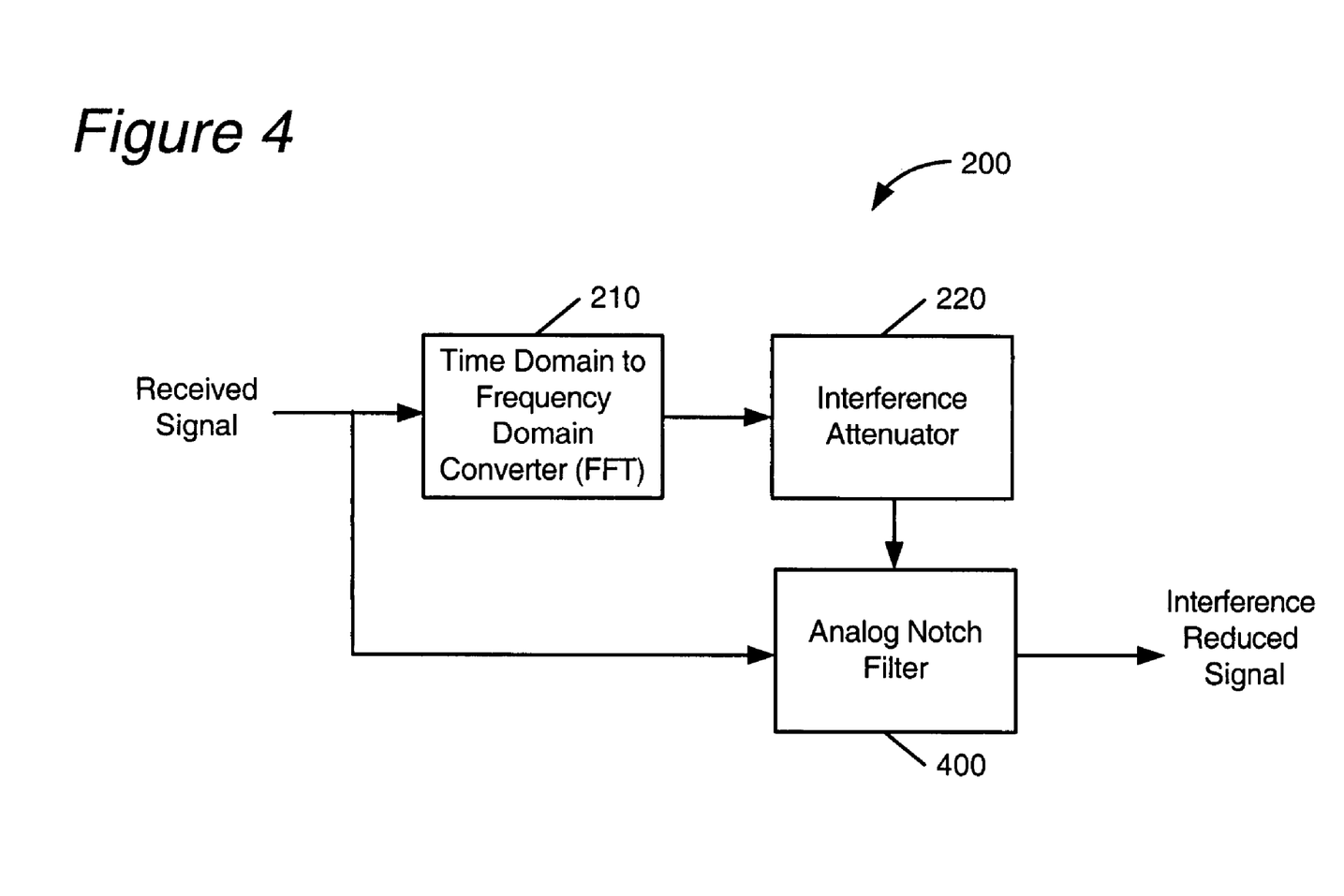
FIG. 4 is a block diagram illustrating an interference reduction component and methods of reducing interference in wireless communications according to some embodiments of the present invention.

The interference reduction component 200 may be implemented in discrete-time circuitry, such as through executable code on a digital signal processor, and/or it may be implemented in analog circuitry. FIG. 4 is a block diagram of the interference reduction component 200 which includes an analog notch filter 400 according to some embodiments of the present invention. The analog notch filter 400 can be configured to vary its attenuation of frequencies in response to control signals from the interference attenuator 220. The interference attenuator 220 may tune the attenuation response of the analog notch filter 400 in response to the frequencies that were identified for the interference component (Block 310 of FIG. 3) so as to reduce the amplitude of the interference component. Accordingly, the analog notch filter 400 can be adaptively tuned to selectively filter the received signal to generate an interference reduced signal.

According to some other embodiments, an interference reduction component, such as, for example, interference reduction component 190 and/or the interference attenuator 220, can identify frequencies of the interference component of a received signal based on a training signal that may be received through the same wireless communications link as the desired signal. For example, the training signal may be transmitted by the radioterminal 120 to the interference reduction component 190 (via satellite 110 and satellite gateway 112) prior to and/or during the radioterminal 120 transmitting communications/signaling information through the uplink 134. The training signal may additionally, or alternatively, be communicated by one or more other communications components in the communications systems 100 and/or 150. The other communications components that transmit a training signal may be geographically dispersed throughout the cells 130'-130''' and/or 180 to enable identification of frequencies of interference components from an aggregate of interference paths (e.g., paths 136, 188, 189). When the communications signal is received through a communications link having a time division multiple access (TDMA) protocol, the training signal may correspond to a known value sequence that is received at a pre-determined location within a frame of the TDMA communications (e.g., a frame header). When the communications signal is transmitted through a communications link having a code division multiple access (CDMA) protocol, the training signal may correspond to characteristics of a CDMA pilot signal that is associated with the service link.

Although exemplary embodiments of the present invention have been described in the context of satellite communication systems for purposes of illustration, it is to be understood that the invention is not limited to satellite communication systems and, instead, may be used in terrestrial cellular communication systems (e.g., cellular/PCS base stations, cellular/PCS radioterminals) and/or other types of wireless communication systems.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of reducing interference in wireless communications, the method comprising:

receiving a signal comprising a desired component and an interference component, the desired component and the interference component of the signal having at least one common frequency therebetween;

converting the signal from a time-domain representation to a frequency-domain representation;

identifying the at least one common frequency in the frequency-domain representation;

attenuating the at least one common frequency of the desired component and the interference component of the signal in the frequency-domain representation to generate an interference reduced frequency-domain signal; and converting the interference reduced frequency-domain signal to a time domain representation so as to generate an interference reduced time-domain signal, wherein attenuating the at least one common frequency of the desired component and the interference component of the signal in the frequency-domain representation to generate an interference reduced frequency-domain signal comprises attenuating the at least one common frequency of the desired component and the interference component so that both the desired component and the interference component are attenuated at the at least one common frequency thereof.

2. The method of claim 1, wherein:

converting the signal from a time-domain representation to a frequency-domain representation comprises performing a Fourier transform on the signal comprising a desired component and an interference component to obtain the frequency domain representation, and identifying the at least one common frequency in the frequency-domain representation comprises comparing at least one element of the frequency domain representation to a threshold.

3. The method of claim 2, wherein comparing the at least one element of the frequency domain representation to a threshold comprises:

identifying at least one frequency at which an amplitude of the frequency domain representation exceeds the threshold.

4. The method of claim 2, wherein the Fourier transfrom comprises a discrete-time Fourier transform.

5. The method of claim 4, wherein the discrete-time Fourier transform comprises a Fast Fourier Transform (FFT) and/or a Discrete Fourier Transform (DFT).

6. The method of claim 1, wherein the time-domain representation comprises a discrete time-domain representation.

7. The method of claim 1, wherein receiving comprises receiving the signal via a plurality of different polarizations and/or antenna elements.

8. The method of claim 7 wherein receiving comprises receiving the signal at a space-based component.

9. The method of claim 7, wherein receiving comprises receiving the signal at a terrestrial component.

10. The method of claim 7, wherein receiving comprises receiving the signal at a radioterminal.

11. The method of claim 1, wherein attenuating the at least one common frequency of the signal comprises reducing an amplitude of the at least one common frequency of the signal to zero.

12. The method of claim 1, wherein:

receiving comprises receiving the signal at a satellite gateway; and the method of identifying and attenuating is carried out at an interference reduction component associated at least partially with the satellite gateway.

13. The method of claim 1, wherein:

receiving comprises receiving the signal at a radioterminal; and the method of identifying and attenuating is carried out at least partially at the radioterminal.

14. The method of claim 1, wherein:

receiving comprises receiving the signal at a space-based component; and the method of identifying and attenuating is carried out at least partially at the space-based component.

15. The method of claim 1, wherein:
receiving comprises receiving the signal at a radioterminal from an ancillary terrestrial component that is using frequencies of a satellite frequency band; and
the method of identifying and attenuating is carried out at least partially at the radioterminal.

16. The method of claim 1, wherein:
receiving comprises receiving the signal at an ancillary terrestrial component from a radioterminal that is using frequencies of a satellite frequency band; and
the method of identifying and attenuating is carried out at least partially at an interference reduction component that is associated at least partially with the ancillary terrestrial component.

17. A wireless communications system comprising:
a receiver configured to receive a signal comprising a desired component and an interference component, the desired component and the interference component of the signal having at least one common frequency therebetween; and
an interference reduction component configured to convert the signal comprising a desired component and an interference component from a time domain representation to a frequency domain representation, to identify the at least one common frequency in the frequency domain representation, to attenuate the at least one common frequency of the desired component and the interference component of the signal in the frequency domain representation to generate an interference reduced frequency domain signal and to convert the interference reduced frequency domain signal to a time domain representation so as to generate an interference reduced time-domain signal, wherein the interference reduction component attenuates the at least one common frequency of the desired component and the interference component of the signal in the frequency-domain representation to generate the interference reduced frequency-domain signal by attenuating both the desired component and the interference component at the at least one common frequency thereof.

18. The communications system of claim 17, wherein the interference reduction component is further configured to convert the signal comprising a desired component and an interference component to the frequency domain representation by performing a Fourier transform on the signal comprising a desired component and an interference component, and to compare at least one element of the frequency domain representation to a threshold.

19. The communications system of claim 18, wherein the interference reduction component is further configured to identify at least one frequency at which an amplitude of the frequency domain representation exceeds the threshold.

20. The communications system of claim 18, wherein the Fourier transform comprises a discrete-time Fourier transform.

21. The communications system of claim 20, wherein the discrete-time Fourier transform comprises a Fast Fourier Transform (FFT) and/or a Discrete Fourier Transform (DFT).

22. The communications system of claim 17, wherein the time domain representation comprises a discrete time domain representation.

23. The communications system of claim 17, wherein the receiver is further configured to receive the signal comprising a desired component and an interference component via a plurality of different polarizations and/or antenna elements.

24. The communications system of claim 23, wherein the receiver is a part of a space-based component.

25. The communications system of claim 23, wherein the receiver is at a terrestrial component.

26. The communications system of claim 23, wherein the receiver is part of a radioterminal.

27. The communications system of claim 17, wherein the interference reduction component is further configured to reduce an amplitude of the at least one common frequency of the signal to zero.

28. The communications system of claim 17, wherein the interference reduction component is at least partially a part of a satellite gateway.

29. The communications system of claim 17, wherein the interference reduction component is at least partially a part of a radioterminal.

30. The communications system of claim 17, wherein the interference reduction component is at least partially a part of a space-based component.

31. The communications system of claim 17, further comprising:
a radioterminal configured to receive the signal comprising a desired component and an interference component from an ancillary terrestrial component that is using frequencies of a satellite frequency band, wherein the radioterminal comprises at least partially the interference reduction component.

32. The communications system of claim 17, further comprising:
an ancillary terrestrial component configured to receive the signal comprising a desired component and an interference component from a radioterminal that is using frequencies of a satellite frequency band, wherein the ancillary terrestrial component comprises at least partially the interference reduction component.

33. A wireless communications system comprising:
a receiver configured to receive a signal using a plurality of different polarizations and/or a plurality of antenna elements, the signal comprising a desired component and an interference component wherein the desired component and the interference component of the signal include at least one common frequency therebetween; and
an interference reduction component configured to convert the signal comprising a desired component and an interference component from a time domain representation to a frequency domain representation, to identify the at least one common frequency in the frequency domain representation, to attenuate the at least one common frequency of the desired component and the interference component of the signal in the frequency domain representation to generate an interference reduced frequency domain signal and to convert the interference reduced frequency domain signal to a time domain representation so as to generate an interference reduced time-domain signal, wherein the interference reduction component attenuates the at least one common frequency of the desired component and the interference component of the signal in the frequency-domain representation to generate the interference reduced frequency-domain signal by attenuating both the desired component and the interference component at the at least one common frequency thereof.

34. A wireless communications method comprising:
receiving a signal using a plurality of different polarizations and/or a plurality of antenna elements, the signal comprising a desired component and an interference component wherein the desired component and the interference component of the signal include at least one common frequency therebetween; and reducing interference by converting the signal comprising a desired component and an interference component from a time domain representation to a frequency domain representation, identifying the at least one common frequency in the frequency domain representation, attenuating the at least one common frequency of the desired component and the interference component of the signal in the frequency domain representation to generate an interference reduced frequency domain signal and converting the interference reduced frequency domain signal to a time domain representation so as to generate an interference reduced time-domain signal, wherein attenuating the at least one common frequency of the desired component and the interference component of the signal in the frequency domain representation to generate an interference reduced frequency domain signal comprises attenuating the at least one common frequency of the desired component and the interference component so that both the desired component and the interference component are attenuated at the at least one common frequency thereof.

* * * * *